United States Patent [19]

Keating et al.

[11] Patent Number: 5,855,759
[45] Date of Patent: Jan. 5, 1999

[54] ELECTROCHEMICAL CELL AND PROCESS FOR SPLITTING A SULFATE SOLUTION AND PRODUCING A HYROXIDE SOLUTION SULFURIC ACID AND A HALOGEN GAS

[75] Inventors: Kenneth Bernard Keating, Wilmington; James Arthur Trainham, III, Greenville, both of Del.; Clarence Garlan Law, Jr., West Trenton, N.J.; John Scott Newman, Kensington, Calif.

[73] Assignee: E. I. du Pont de Nemours and Company, Wilmington, Del.

[21] Appl. No.: 962,638

[22] Filed: Nov. 3, 1997

Related U.S. Application Data

[63] Continuation of Ser. No. 834,013, Apr. 11, 1997, abandoned, which is a continuation of Ser. No. 431,605, May 1, 1995, abandoned, which is a continuation-in-part of Ser. No. 156,196, Nov. 22, 1993, Pat. No. 5,411,641, and Ser. No. 93,468, Jan. 8, 1998, and Ser. No. 246,909, May 20, 1994, Pat. No. 5,580,437, which is a continuation-in-part of Ser. No. 93,535, Jun. 8, 1998, which is a continuation-in-part of Ser. No. 156,196, Jun. 8, 1998.

[51] Int. Cl.⁶ .................................................. C25B 1/00
[52] U.S. Cl. ..................... 205/508; 205/514; 205/515; 205/516; 205/554; 204/263; 204/265; 204/520; 204/630
[58] Field of Search ................... 205/514, 516, 205/515, 464, 512, 508, 520, 630; 204/265, 263

[56] References Cited

U.S. PATENT DOCUMENTS

3,453,187  7/1969  Slatin ........................................ 204/69
3,729,395  4/1973  Caron et al. ........................... 204/59 R (List continued on next page.)

FOREIGN PATENT DOCUMENTS

| | | |
|---|---|---|
| 1 179 631 | 12/1984 | Canada . |
| 1 195 949 | 10/1985 | Canada . |
| 0 319 489 | 6/1989 | European Pat. Off. . |
| 2 413 481 | 7/1979 | France . |
| 2 312 297 | 3/1973 | Germany . |
| 35 29 640 | 2/1987 | Germany . |
| 56-36873 | 8/1981 | Japan . |
| 4-171028 | 6/1992 | Japan . |
| 363424 | 12/1931 | United Kingdom . |
| 861978 | 3/1961 | United Kingdom . |
| 2 073 251 | 10/1981 | United Kingdom . |

OTHER PUBLICATIONS

Appleby, A.J. et al., Solid Polymer Acid Electrolytes, *Fuel Cell Handbook*, 10, 286–312. 1989.

Jewulski, J.R., et al., Solid State Proton Conductors, Final Report, Work Performed Under Contract No.: DE–AC21–88MC24218 for U.S. Department of Energy, 1–99, Dec. 1990.

Minz, F.R. (Dr.), HCl–Electrolysis –Technology for Recycling Chlorine, Bayer AG, Apr. 21–23, 1993. Conference on Electrochemical Processing Innovation, and Progress, Glasgow, Scotland, UK.

(List continued on next page.)

*Primary Examiner*—Kathryn L. Gorgos

[57] ABSTRACT

The present invention relates to an electrochemical cell and a process for producing a hydroxide solution, sulfuric acid and a halogen gas from a hydrogen halide and a sulfate solution. In particular, the sulfate solution may be an alkali metal sulfate solution, such as sodium or potassium sulfate solution, an alkaline earth metal sulfate solution or an ammonium sulfate solution. The cell and the process may use either an anhydrous or an aqueous hydrogen halide, namely, hydrogen chloride, hydrogen fluoride, hydrogen bromide and hydrogen iodide, to a respective dry halogen gas, such as chlorine, fluorine, bromine, or iodine, to produce hydrogen ions in order to split the alkali metal solution and form the sulfuric acid. The cell has two membrane-electrode assemblies, where an anode is disposed in contact with one membrane, and a cathode is disposed in contact with another membrane. The sulfate solution is fed in between the membrane-electrode assemblies.

35 Claims, 2 Drawing Sheets

U.S. PATENT DOCUMENTS

| | | | |
|---|---|---|---|
| 4,139,447 | 2/1979 | Faron et al. | 204/239 |
| 4,169,025 | 9/1979 | Needes | 204/98 |
| 4,191,618 | 3/1980 | Coker et al. | 204/98 |
| 4,210,501 | 7/1980 | Dempsey et al. | 204/129 |
| 4,214,957 | 7/1980 | Ogawa et al. | 204/98 |
| 4,214,969 | 7/1980 | Lawrance | 204/255 |
| 4,224,121 | 9/1980 | Dempsey et al. | 204/98 |
| 4,294,671 | 10/1981 | Balko | 204/128 |
| 4,311,568 | 1/1982 | Balko | 204/128 |
| 4,504,373 | 3/1985 | Mani et al. | 204/180 P |
| 4,561,945 | 12/1985 | Coker et al. | 204/98 |
| 4,595,579 | 6/1986 | Prudhon et al. | 423/487 |
| 4,613,416 | 9/1986 | Kau et al. | 204/98 |
| 4,655,887 | 4/1987 | Oda et al. | 204/98 |
| 4,666,574 | 5/1987 | Oda et al. | 204/98 |
| 4,725,341 | 2/1988 | Minz | 204/128 |
| 4,909,912 | 3/1990 | Oda et al. | 204/98 |
| 4,959,132 | 9/1990 | Fedkiw, Jr. | 204/101 |
| 5,223,102 | 6/1993 | Fedkiw, Jr. et al. | 204/78 |

OTHER PUBLICATIONS

Takenaka, H. et al., Solid Polymer Electrolyte Water Electrolysis, *Int. J. Hydrogen Energy*, 7(5), 397–403, 1982. No month available.

De Nora Permelec, Oronzio de Nora Group, Electrolysis of Non Chloride Sodium Salts; Production of Caustic Soda Without Chlorine; ByProduct Salt Splitting with Recycling to the Process Hydrina® Membrane Electrolyzers. No date available.

Strathmann, H., Applications, *Membrane Handbook*, W.S. Winston Ho, Editor, Van Nostrand Reinhold, NY, pp. 255–262. No date available.

Wilson, M.S. et al., High Performance Catalyzed Membranes of Ultra–low Pt Loadings for Polymer Electrolyte Fuel Cells, *J. Electrochem. Soc.*, 2, L–28 –L–30, Feb. 1992.

Jorissen, J. et al., The Behavior of Ion Exchange Membranes in Electrolysis and Electrodialysis of Sodium Sulphate, *J. of Applied Electrochemistry*, 21, 869–876 (1991). No month available Genders, D. et al., Novel Approaches to Salt Splitting, Conf, On Electrochemical Processing —Innovation and Progress, Apr. 21, 23–1993, Glasgow, Scotland, UK.

ELECTROCHEMICAL CELL AND PROCESS FOR SPLITTING A SULFATE SOLUTION AND PRODUCING A HYROXIDE SOLUTION SULFURIC ACID AND A HALOGEN GAS

This application is a continuation of U.S. application Ser. No. 08/834,013, filed Apr. 11, 1997, abandoned, which is a continuation of U.S. application Ser. No. 08/431,605, filed May 1, 1995, abandoned, which is a continuation-in-part of U.S. application Ser. No. 08/156,196, filed Nov. 22, 1993, now U.S. Pat. No. 5,411,641 which was surrendered in favor of U.S. reissue application Ser. No. 09/093,468 filed Jan. 8, 1998, pending, and a continuation-in-part of U.S. application Ser. No. 08/246,909, filed May 20, 1994, now U.S. Pat. No. 5,580,437, which was surrendered in favor of U.S. reissue application Ser. No. 09/093,535 filed Jun. 8, 1998, pending, which is a C-I-P of U.S. Ser. No. 08/156,196.

BACKGROUND OF THE INVENTION

1. Field of the Invention

The present invention relates to an electrochemical cell and a process for splitting a solution and producing a hydroxide, sulfuric acid and a halogen gas. In particular, the cell and the process may convert either an anhydrous or an aqueous hydrogen halide, such as hydrogen chloride, to a halogen gas, such as chlorine gas, and a solution such as a sodium sulfate aqueous solution, to form sulfuric acid and sodium hydroxide, along with its co-product, hydrogen.

2. Description of the Related Art

Hydrogen chloride (HCl) or hydrochloric acid is a reaction by-product of many manufacturing processes which use chlorine. For example, chlorine is used to manufacture polyvinyl chloride, isocyanates, and chlorinated hydrocarbons/fluorinated hydrocarbons, with hydrogen chloride as a by-product of these processes. Because supply so exceeds demand, hydrogen chloride or the acid produced often cannot be sold or used, even after careful purification. Shipment over long distances is not economically feasible. Discharge of the acid or chloride ions into waste water streams is environmentally unsound. Recovery and feedback of the chlorine to the manufacturing process is the most desirable route for handling the HCl by-product.

A number of commercial processes have been developed to convert HCl into usable chlorine gas. See, e.g., F. R. Minz, "HCl-Electrolysis—Technology for Recycling Chlorine", Bayer AG, Conference on Electrochemical Processing, Innovation & Progress, Glasgow, Scotland, UK, Apr. 21–Apr. 23, 1993.

Currently, thermal catalytic oxidation processes exist for converting anhydrous HCl and aqueous HCl into chlorine. Commercial processes, known as the "Shell-Chlor", the "Kel-Chlor" and the "MT-Chlor" processes, are based on the Deacon reaction. The original Deacon reaction as developed in the 1870's made use of a fluidized bed containing a copper chloride salt which acted as the catalyst. The Deacon reaction is generally expressed as follows:

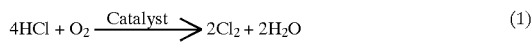

where the following catalysts may be used, depending on the reaction or process in which equation (1) is used.

| Catalyst | Reaction or Process |
| --- | --- |
| Cu | Deacon |
| Cu, Rare Earth, Alkali | Shell-Chlor |
| $NO_2$, $NOHSO_4$ | Kel-Chlor |
| $Cr_mO_n$ | MT-Chlor |

The commercial improvements to the Deacon reaction have used other catalysts in addition to or in place of the copper used in the Deacon reaction, such as rare earth compounds, various forms of nitrogen oxide, and chromium oxide, in order to improve the rate of conversion, to reduce the energy input and to reduce the corrosive effects on the processing equipment produced by harsh chemical reaction conditions. However, in general, these thermal catalytic oxidation processes are complicated because they require separating the different reaction components in order to achieve product purity. They also involve the production of highly corrosive intermediates, which necessitates expensive construction materials for the reaction systems. Moreover, these thermal catalytic oxidation processes are operated at elevated temperatures of 250° C. and above.

Electrochemical processes exist for converting aqueous HCl to chlorine gas by passage of direct electrical current through the solution. The current electrochemical commercial process is known as the Uhde process. In the Uhde process, aqueous HCl solution of approximately 22% is fed at 65° to 80° C. to both compartments of an electrochemical cell, where exposure to a direct current in the cell results in an electrochemical reaction and a decrease in HCl concentration to 17% with the production of chlorine gas and hydrogen gas. A polymeric separator divides the two compartments. The process requires recycling of dilute (17%) HCl solution produced during the electrolysis step and regenerating an HCl solution of 22% for feed to the electrochemical cell. The overall reaction of the Uhde process is expressed by the equation:

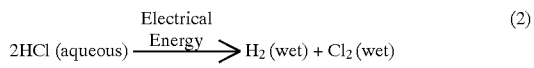

As is apparent from equation (2), the chlorine gas produced by the Uhde process is wet, usually containing about 1% to 2% water. This wet chlorine gas must then be further processed to produce a dry, usable gas. If the concentration of HCl in the water becomes too low, it is possible for oxygen to be generated from the water present in the Uhde process. This possible side reaction of the Uhde process due to the presence of water, is expressed by the equation:

Further, the presence of water in the Uhde system limits the current densities at which the cells can perform to less than 500 amps./ft.$^2$, because of this side reaction. The side reaction results in reduced electrical efficiency and corrosion of the cell components.

Another electrochemical process for processing aqueous HCl has been described in U.S. Pat. No. 4,311,568 to Balko. Balko employs an electrolytic cell having a solid polymer electrolyte membrane. Hydrogen chloride, in the form of hydrogen ions and chloride ions in aqueous solution, is introduced into an electrolytic cell. The solid polymer electrolyte membrane is bonded to the anode to permit transport from the anode surface into the membrane. In Balko, controlling and minimizing the oxygen evolution side reaction is an important consideration. Evolution of oxygen decreases cell efficiency and leads to rapid corrosion of components of the cell. The design and configuration of the anode pore size and electrode thickness employed by Balko maximizes transport of the chloride ions. This results in effective chlorine evolution while minimizing the evolution of oxygen, since oxygen evolution tends to increase under conditions of chloride ion depletion near the anode surface. In Balko, although oxygen evolution may be minimized, it is not eliminated. As can be seen from FIGS. 3 to 5 of Balko, as the overall current density is increased, the rate of oxygen evolution increases, as evidenced by the increase in the concentration of oxygen found in the chlorine produced. Balko can run at higher current densities, but is limited by the deleterious effects of oxygen evolution. If the Balko cell were to be run at high current densities, the anode would be destroyed.

Electrodialysis, a technology based on the use of cation-exchange and/or anion exchange membranes and of an electric field to effect ion separations, has been the subject of many recent books, articles and papers. See, for example, "Membrane Handbook", edited by W. S. W. Ho and K. K. Sirkar, Van Nostrand Reinhold, New York; and "The Green Potential of Electrochemistry, Part 2 Application" by D. Pletcher and N. L. Weinberg, *Chemical Engineering*, November, 1992, pg. 132–141. In recent years, DeNora Permelec, SpA, of Milan, Italy, has developed the HYDRINA® process, which generates sodium hydroxide without producing chlorine, using principles of electrodialysis. See "HYDRINA® Membrane Electrolyzers", published by DeNora Permelec, SpA. In this process, hydrogen and aqueous sodium sulfate are typically fed to a cell, where sodium hydroxide and hydrogen are formed. Commercial applications of electrodialysis now exist in brackish water desalination, treatment of industrial effluents, and in many other areas. See Ho and Sirkar, "Industrial Applications of Electrodialysis and Related Processes", Table 20-1.

A very recent review of salt splitting utilizing electrodialysis was given at the "Conference on Electrochemical Processing, Innovations and Progress", April 1993, Glasgow, Scotland, UK, entitled "Novel Approaches to Salt Splitting" by D. Genders, D. Hartsough and J. Thompson, pp. 21–23. FIG. 1 herein, which is described in this paper, shows a schematic of a three-component cell, shown generally at 1, for splitting sodium sulfate into sulfuric acid and sodium hydroxide. As shown in FIG. 1, cell 1 includes an anode 2, an anion-exchange membrane membrane 4, a cation exchange membrane 6 and a cathode 8. An aqueous solution of sodium sulfate is introduced into a central compartment bounded by anion exchange membrane 4, facing anode 2. Under the influence of an impressed electric field, sulfate ions migrate toward the anode and pass through the anion exchange membrane, where they combine with protons produced from water. The water is introduced into the anode compartment, where, by means of an electrochemical reaction, it is converted into protons and oxygen. Sodium ions from the sodium sulfate migrate through cation-exchange membrane 6 to the cathode compartment, which is also fed with water or dilute sodium hydroxide, whereby they combine with hydroxyl ions formed by the electrochemical reaction of the reduction of water to hydrogen and hydroxyl ion. The products of the electrodialysis are sulfuric acid and sodium hydroxide, and the gases, oxygen and hydrogen. The key to this electrodialysis process is the use of ion-selective membranes, that is, membranes which permit only cations (cation exchange membranes) or anions (anion exchange membranes) to pass therethrough, and reject ions of opposite charge. A number of such membranes are now commercially available, such as a membrane which is made of hydrated, copolymers of polytetrafluoroethylene and poly-sulfonyl fluoride vinyl ether-containing pendant sulfonic acid groups, and sold under the trademark "NAFION®" (hereinafter referred to as NAFION®) by E. I. du Pont de Nemours and Company of Wilmington, Del. (hereinafter referred to as "DuPont").

The difficulty of disposing of, which includes selling, hydrogen chloride, has been discussed above. In addition, the problem of disposing of large quantities of salts is becoming an increasing concern, in particular, the disposal of sodium salts, especially the sulfate which is formed as a by-product of pulp and paper industries, rayon plants, acid waste neutralization, pharmaceutical processes and other kinds of chemical process. See "HYDRINA® Membrane Electrolyzers", supra. In order to dispose of hydrogen chloride and sodium salts, several distinct, separate processes have been necessary. Thus, the need exists for a single process and apparatus for an environmentally and economically attractive technique to recycle these materials into useful products, which in many cases, may be key starting materials for other processes.

SUMMARY OF THE INVENTION

The present invention solves the problems of the prior art by providing a single process and apparatus for recycling a hydrogen halide and sulfate solution into useful products. More specifically, the present invention solves the problems of the prior art by providing a process and an electrochemical cell which permit simultaneous production of three useful materials, fundamental to the modern chemical industry, halogen gas, such as chlorine, an acid, such as sulfuric acid, and a base, such as sodium hydroxide, from two materials, very often formed as a by-product of chemical processes, and under environmental restraint and facing large excesses in the market place, such as hydrogen chloride and sodium sulfate. Such process and cell are especially useful at a plant site where both hydrogen chloride and sodium sulfate are produced, and where the products of such a process and cell could be recycled to other production processes.

It is preferable that the electrochemical cell and the process of the present invention use an essentially anhydrous hydrogen halide as a reactant. This process allows for direct processing of anhydrous hydrogen halide which is a by-product of manufacturing processes, without first dissolving the hydrogen halide in water. This direct production of essentially dry halogen gas, when done, for example, for chlorine gas, is less capital intensive than processes of the prior art, which require separation of water from the chlorine gas. This direct production of essentially dry chlorine gas also requires lower investment costs than the electrochemical conversions of hydrogen chloride of the prior art. This advantage can translate directly into lower power costs per pound of say, chlorine, generated than in the aqueous electrochemical processes of the prior art. The direct production of essentially dry chlorine gas also provides a process which produces drier chlorine gas with fewer processing steps as compared to that produced by electrochemical or catalytic systems of the prior art, thereby simplifying processing conditions and reducing capital costs.

To achieve the foregoing solutions, and in accordance with the purposes of the invention as embodied and broadly described herein, there is provided a process for producing a hydroxide solution, sulfuric acid and a halogen gas from a hydrogen halide and a sulfate solution, wherein a sulfate solution is fed to a first compartment of an electrochemical cell, wherein the sulfate solution comprises sulfate ions and cations; hydrogen halide is fed to a second compartment of the electrochemical cell and is transported to an anode of the cell; the hydrogen halide is oxidized at the anode to produce halogen gas and protons, and the protons are transported through a first cation-transporting membrane; the first membrane rejects the sulfate ions and the sulfate ions join the protons to form a sulfuric acid solution; water is fed to a third compartment of the cell and is reduced at a cathode of the cell to hydrogen and hydroxyl ions; and a second membrane rejects the hydroxyl ions and the hydroxyl ions are joined with the cations to form a solution of hydroxide.

Further in accordance with the present invention, there is provided an electrochemical cell for producing a hydroxide solution, sulfuric acid and a halogen gas from a hydrogen halide and a sulfate solution, comprising means for introducing a sulfate solution into a first compartment of the cell, wherein the sulfate solution comprises sulfate ions and cations; means for introducing hydrogen halide to a second compartment; means for oxidizing the hydrogen halide to produce halogen gas and protons; first cation-transporting means for transporting the protons therethrough, wherein the first cation-transporting means is disposed in contact with the oxidizing means and the first cation-transporting means rejects the sulfate ions, and the sulfate ions join the protons to form a sulfuric acid solution; means for introducing water to a third compartment; means for reducing the water to hydrogen and hydroxyl ions; and second cation-transporting means for rejecting the hydroxyl ions and for transporting the cations therethrough, wherein the second cation-transporting is disposed in contact with the reducing means and the hydroxyl ions are joined with the cations to form a solution of hydroxide.

DESCRIPTION OF THE PREFERRED EMBODIMENTS

Reference will now be made in detail to the present preferred embodiments of the invention as illustrated in the accompanying drawings.

In accordance with the present invention, there is provided an electrochemical cell for producing a hydroxide solution, sulfuric acid and a halogen gas from a hydrogen halide and a solution. Such a cell is shown generally at 10 in FIG. 2. In this cell, hydrogen, as well as chlorine gas, is produced. The cell of the present invention may use essentially anhydrous hydrogen chloride as a reactant and directly produce essentially dry chlorine gas, which will be referred to as the anhydrous case. The term "direct" means that the electrochemical cell obviates the need to remove water from the halogen gas produced or the need to convert essentially anhydrous hydrogen halide to aqueous hydrogen halide before electrochemical treatment. However, it should be noted that the cell of the present invention may also use aqueous hydrogen chloride as a reactant and produce wet chlorine, which will be referred to as the aqueous case. The cell of the present invention will be described as using hydrogen chloride as a reactant to produce chlorine gas, in either the anhydrous or the aqueous case. However it should be noted that this cell may alternatively be used to produce other halogen gases, such as bromine, fluorine (in the anhydrous case only) and iodine from a respective anhydrous hydrogen halide, such as hydrogen bromide, hydrogen fluoride and hydrogen iodide. In addition, the cell is described and shown for splitting a sodium sulfate solution, $NaSO_4$ (aq). However, it should be understood that other solutions may be split by this cell.

Figure 2:
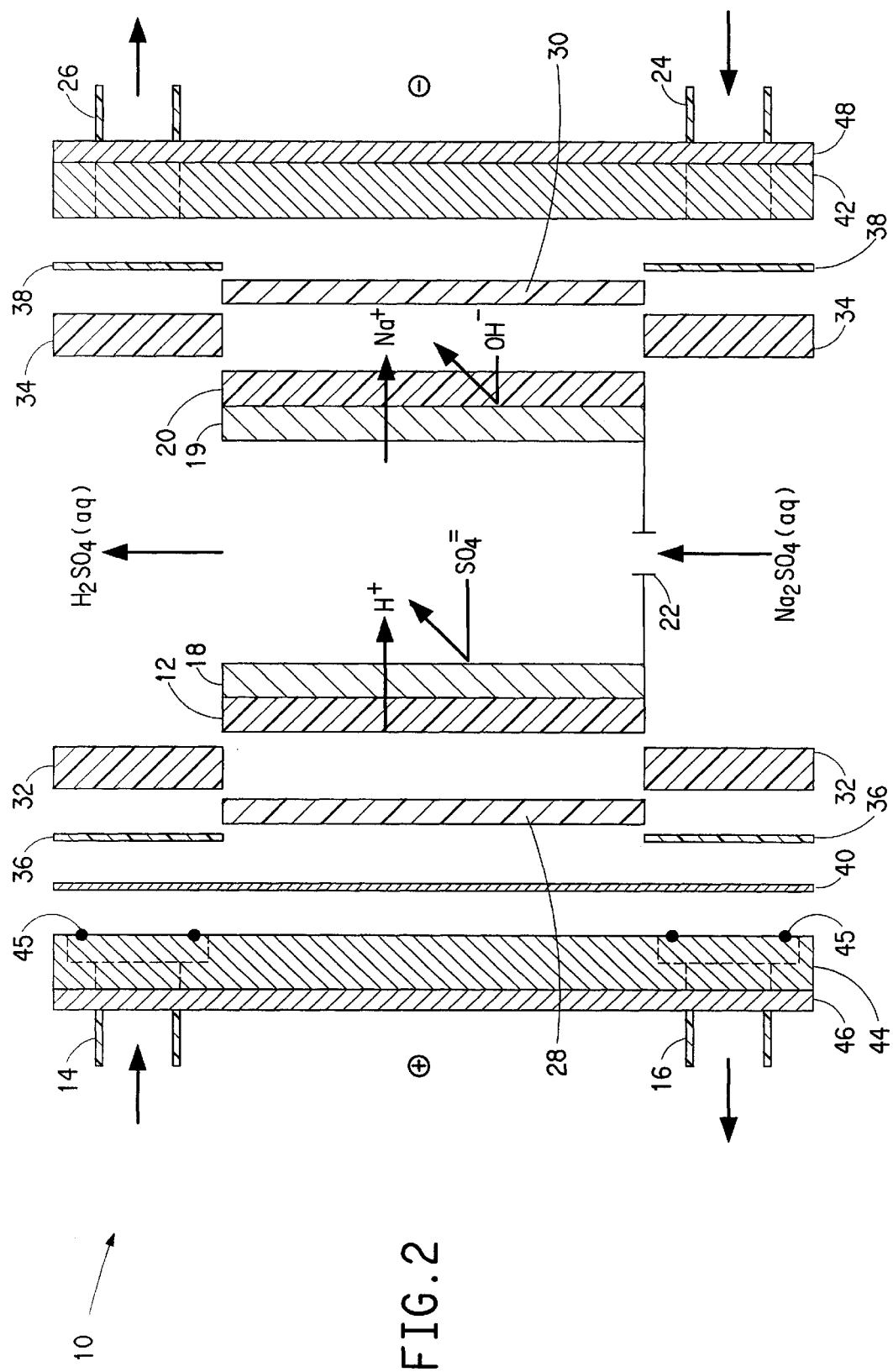
FIG. 2 is an exploded, cross-sectional view of an electrochemical cell which produces an alkali metal hydroxide, sulfuric acid and a halogen by splitting an alkali metal solution according to the present invention.

In either the anhydrous or the aqueous case, the electrochemical cell of the present invention comprises means for introducing a sulfate solution to a first compartment. The inlet means preferably comprises an inlet 22 as shown in FIG. 2. A sulfate solution, which is sodium sulfate $NaSO_4$ (aq) in FIG. 2, is introduced through inlet 22.

The sulfate solution comprises sulfate ions and cations. The cation may be either an alkali metal ion, an alkaline earth metal ion or an ammonium ion. However, it should be noted that the present invention need not be limited to these types of ions, provided that the ions are capable of being transmitted through a cation-transporting membrane. When the cation is an alkali metal ion, the hydroxide solution is an alkali metal solution, and the sulfate solution is an alkali metal sulfate solution. Preferably, the alkali metal is either sodium or potassium. When the cation is an alkaline earth metal ion, the hydroxide solution is an alkaline earth metal hydroxide solution, and the sulfate solution is an alkaline earth metal sulfate solution. Examples of the alkaline earth metals particularly useful with the present invention include calcium and magnesium. When the cation is an ammonium ion, the hydroxide solution is an ammonium solution, and the sulfate solution is an ammonium sulfate solution.

In either the anhydrous or the aqueous case, the electrochemical cell of the present invention also comprises means for introducing hydrogen halide to a second compartment. Preferably, the means for introducing hydrogen halide is an inlet 14 as shown in FIG. 2. In addition, electrochemical cell 10 has an anode-side outlet 16 as shown in FIG. 2. Since in the preferred embodiment, anhydrous HCl is carried through the inlet, and chlorine gas is carried through the outlet, the inlet and the outlet may be lined with a copolymer of tetrafluoroethylene with (perfluoro)alkylvinyl either, sold under the trademark TEFLON® PFA (hereinafter referred to as "PFA", by DuPont.

In either the anhydrous or the aqueous case, the electrochemical cell of the present invention also comprises means for oxidizing hydrogen halide to produce halogen gas and protons. In the anhydrous case, the oxidizing means comprises means for oxidizing molecules of essentially anhydrous hydrogen halide, preferably anhydrous hydrogen chloride, to produce essentially dry halogen gas, preferably, chlorine gas. In the aqueous case, the oxidizing means comprises means for oxidizing ions of aqueous hydrogen halide, preferably hydrogen chloride, to produce wet halogen gas, preferably chlorine gas. In either case, the oxidizing means comprises an anode 12 as shown in FIG. 2, and the chlorine gas ($Cl_2$) exits through anode-side outlet 16 as shown in FIG. 2.

In either the aqueous or the anhydrous case, the electrochemical cell of the present invention also comprises first cation-transporting means for transporting the protons therethrough, wherein the first cation-transporting means is disposed in contact with the oxidizing means. The first cation-transporting means preferably comprises a cation-transporting membrane 18 which is disposed in contact with anode 12 as shown in FIG. 2. The protons, designated as $H^+$ in FIG. 2, are transported through the membrane as illustrated by the straight arrow going through anode 12 and membrane 18.

More specifically, membrane 18 may be a proton-conducting membrane. Membrane 18 may be a commercial cationic membrane made of a fluoro- or perfluoropolymer, preferably a copolymer of two or more fluoro or perfluoromonomers, at least one of which has pendant sulfonic acid groups. The presence of carboxylic groups is not desirable, because those groups tend to decrease the conductivity of the membrane when they are protonated. Various suitable resin materials are available commercially or can be made according to patent literature. They include fluorinated polymers with side chains of the type —$CF_2CFRSO_3H$ and —$OCF_2CF_2CF_2SO_3H$, where R is an F, Cl, $CF_2Cl$, or a $C_1$ to $C_{10}$ perfluoroalkyl radical. The membrane resin may be, for example, a copolymer of tetrafluoroethylene with $CF_2=CFOCF_2CF(CF_3)OCF_2CF_2SO_3H$. Sometimes those resins may be in the form that has pendant —$SO_2F$ groups, rather than —$SO_3H$ groups. The sulfonyl fluoride groups can be hydrolyzed with potassium hydroxide to —$SO_3K$ groups, which then are exchanged with an acid to —$SO_3H$ groups. Suitable perfluorinated cationic membranes, which are made of hydrated, copolymers of polytetrafluoroethylene and poly-sulfonyl fluoride vinyl ether-containing pendant sulfonic acid groups, are NAFION® membranes. In particular, NAFION® membranes containing pendant sulfonic acid groups include NAFION® 117, NAFION® 324 and NAFION® 417. The first type of NAFION® is unsupported and has an equivalent weight of 1100 g., equivalent weight being defined as the amount of resin required to neutralize one liter of a 1M sodium hydroxide solution. The other two types of NAFION® are both supported on a fluorocarbon fabric, the equivalent weight of NAFION® 417 also being 1100 g. NAFION® 324 has a two-layer structure, a 125 $\mu$m-thick membrane having an equivalent weight of 1100 g., and a 25 $\mu$m-thick membrane having an equivalent weight of 1500 g.

Although the present invention describes the use of a solid polymer electrolyte membrane, it is well within the scope of the invention to use other cation-transporting membranes which are not polymeric. For example, proton-conducting ceramics such as beta-alumina may be used. Beta-alumina is a class of nonstoichiometric crystalline compounds having the general structure $Na_2O_x \cdot Al_2O_3$, in which x ranges from 5 ($\beta''$-alumina) to 11 ($\beta$-alumina). This material and a number of solid electrolytes which are useful for the invention are described in the *Fuel Cell Handbook,* A. J. Appleby and F. R. Foulkes, Van Nostrand Reinhold, N.Y., 1989, pages 308–312. Additional useful solid state proton conductors, especially the cerates of strontium and barium, such as strontium ytterbiate cerate ($SrCe_{0.95}Yb_{0.05}O_{3-\alpha}$) and barium neodymiate cerate ($BaCe_{0.9}Nd_{0.01}O_{3-\alpha}$) are described in a final report, DOE/MC/24218-2957, Jewulski, Osif and Remick, prepared for the U.S. Department of Energy, Office of Fossil Energy, Morgantown Energy Technology Center by Institute of Gas Technology, Chicago, Ill., December, 1990.

As noted above, the sulfate solution comprises sulfate ions and cations. The first membrane of the present invention rejects the sulfate ions, $SO_4^=$, as illustrated with the angled arrow off membrane 18 in FIG. 2. The sulfate ions join the protons which are transported through membrane 18 to form a sulfuric acid solution, $H_2SO_{4(aq)}$ as shown in FIG. 2.

In either the aqueous or the anhydrous case, the electrochemical cell of the present invention also comprises means for introducing water to a third compartment. Preferably, the means for introducing water comprises an inlet 24. Water, $H_2O$ as shown in FIG. 2, enters the cell through inlet 24.

In either the anhydrous or the aqueous case, the electrochemical cell of the present invention also comprises means for reducing the water to produce hydroxyl ions and hydrogen. As shown in FIG. 2, the reducing means comprises a cathode 20. The cathode reduces the water to hydrogen and the hydroxyl ions. The hydrogen ($H_2$) leaves the cell through an outlet 26 as shown in FIG. 2.

The anode and the cathode may comprise porous, gas-diffusion electrodes. Such electrodes provide the advantage of high specific surface area, as known to one skilled in the art. The anode and the cathode comprise an electrochemically active material disposed adjacent, meaning at or under, the surface of the cation-transporting membrane. A thin film of the electrochemically active material may be applied directly to the membrane. Alternatively, the electrochemically active material may be hot-pressed to the membrane, as shown in A. J. Appleby and E. B. Yeager, Energy, Vol. 11, 137 (1986). Alternatively, the electrochemically active material may be deposited into the membrane, as shown in U.S. Pat. No. 4,959,132 to Fedkiw. The electrochemically active material may comprise any type of catalytic or metallic material or metallic oxide, as long as the material can support charge transfer. Preferably, the electrochemically active material may comprise a catalyst material such as platinum, ruthenium, osmium, rhenium, rhodium, iridium, palladium, gold, titanium or zirconium and the oxides, alloys or mixtures thereof. However, in general, the oxides of these materials are not used for the cathode. Other catalyst materials suitable for use with the present invention may include, but are not limited to, transition metal macro cycles in monomeric and polymeric forms and transition metal oxides, including perovskites and pyrochores.

In a hot-pressed electrode, the electrochemically active material may comprise a catalyst material on a support material. The support material may comprise particles of carbon and particles of polytetrafluoroethylene, which is sold under the trademark "TEFLON®" (hereinafter referred to as "PTFE"), commercially available from DuPont. The electrochemically active material may be bonded by virtue of the PTFE to a support structure of carbon paper or graphite cloth and hot-pressed to the cation-transporting membrane. The hydrophobic nature of PTFE does not allow a film of water to form at the anode. A water barrier in the electrode would hamper the diffusion of HCl to the reaction sites. The electrodes are preferably hot-pressed into the membrane in order to have good contact between the catalyst material and the membrane.

The loadings of electrochemically active material may vary based on the method of application to the membrane. Hot-pressed, gas-diffusion electrodes typically have loadings of 0.10 to 0.50 mg/cm$^2$. Lower loadings are possible with other available methods of deposition, such as distributing them as thin films from inks onto the membranes, as described in Wilson and Gottesfeld, "High Performance Catalyzed Membranes of Ultra-low Pt Loadings for Polymer Electrolyte Fuel Cells", Los Alamos National Laboratory, J. Electrochem. Soc., Vol. 139, No. 2 L28–30, 1992, where the inks contain solubilized NAFION® to enhance the catalystionomer surface contact and to act as a binder to the NAFION® perfluorinated membrane sheet. With such a system, loadings as low as 0.017 mg active material per cm$^2$ have been achieved.

In either the aqueous or the anhydrous case, the electrochemical cell of the present invention also comprises second cation-transporting means for transporting the cations therethrough, wherein the second cation-transporting means is disposed in contact with the reducing means. The second cation-transporting means preferably comprises a second cation-transporting membrane 19 as shown in FIG. 2. As shown in FIG. 2, first cation-transporting membrane 18 and second cation-transporting membrane 19 face each other. The second cation-transporting membrane may be made of any of the materials or constructed like any of the configurations as described above for the first cation-transporting membrane. The anode 12/membrane 18 assembly and the cathode 20/membrane 19 are similar to membrane electrode assemblies (MEA's) of the prior art, except that in the present invention, each membrane is disposed in contact with only one electrode, rather than two. Both the first and the second membranes are hydrated by the water present in the feed of the aqueous sodium sulfate. The second cation-transporting means, or membrane, rejects the hydroxyl ions, as illustrated by the angled arrow off membrane 19, and the hydroxyl ions are joined with the cations to form a solution of hydroxide, such as sodium hydroxide NaOH(aq) as shown in FIG. 2, which exits the cell through outlet 26.

Figure 1:
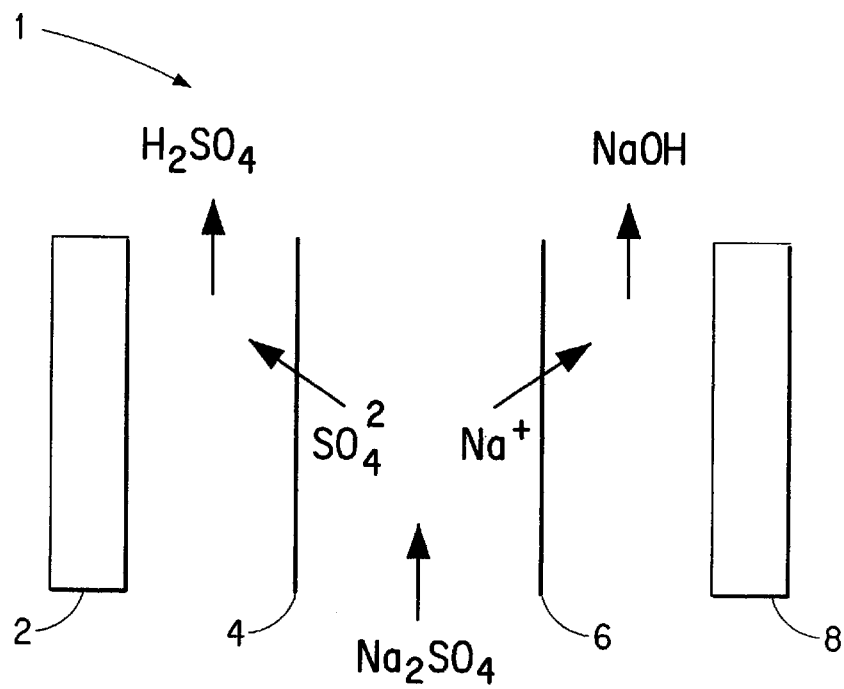
FIG. 1 is a schematic view of a three-compartment electrodialysis cell of the prior art for splitting sodium sulfate into sulfuric acid and sodium hydroxide.
Figure 3A:
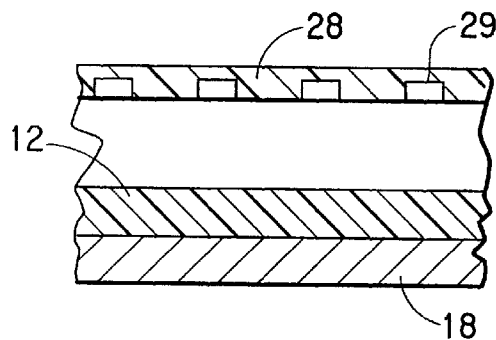
FIG. 3A is a is a top cross-sectional view of the anode mass flow field as shown in FIG. 2.
Figure 3B:
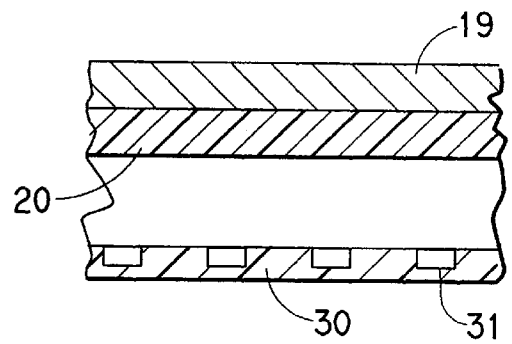
FIG. 3B is a is a top cross-sectional view of the cathode mass flow field as shown in FIG. 2.

The electrochemical cell of the first and second embodiments further comprises an anode flow field 28 disposed in contact with the anode and a cathode flow field 30 disposed in contact with the cathode. The flow fields are electrically conductive, and act as both mass and current flow fields. The purpose of the anode flow field is to get reactants, such as anhydrous HCl in the first and second embodiments, to the anode and products, such as essentially dry chlorine gas from the anode. The purpose of the cathode flow field is to get reactants, such as liquid water to the cathode and products, such as hydrogen gas, from the cathode. More specifically, anode mass flow field 28 includes a plurality of flow channels 29 as shown in FIG. 3A for directing the anhydrous or aqueous HCl to the anode and chlorine gas away from the anode, and the cathode mass flow field 30 includes a plurality of flow channels 31 as shown in FIG. 3B for directing the water added through cathode-side inlet 24 in FIG. 2 to the cathode and sodium hydroxide and hydrogen away from the cathode. FIG. 3A is a cut-away, top cross-sectional view of the anode mass flow field of FIG. 1, and FIG. 3B is a cut-away top cross-sectional view of the cathode mass flow field of FIG. 1. It is within the scope of the present invention that the flow fields and the flow channels may have a variety of configurations and may be made of different materials. Also, the flow fields may be made in any manner known to one skilled in the art.

In either the anhydrous or the aqueous case, the electrochemical cell of the present invention may also comprise an anode mass flow manifold 32 and a cathode mass flow field manifold 34 as shown in FIG. 2. The purpose of such manifolds is to form a frame around the anode mass flow field and the anode, and the cathode mass flow field and the cathode, respectively. These manifolds are preferably made of a corrosion resistant material, such as PFA. A gasket 36, 38, also contributes to forming a frame around the respective anode and cathode mass flow fields. These gaskets are preferably also made of a corrosion resistant material, such as PTFE.

The electrochemical cell of the first and second embodiments also comprises an anode current bus 46 and a cathode current bus 48 as shown in FIG. 2. The current buses conduct current to and from a voltage source (not shown). Specifically, anode current bus 46 is connected to the positive terminal of a voltage source, and cathode current bus 48 is connected to the negative terminal of the voltage source, so that when voltage is supplied to the cell, current flows through all of the cell components to the right of current bus 46 as shown in FIG. 2, including current bus 48, from which it returns to the voltage source. The current buses are made of a conductor material, such as copper.

In either the anhydrous or the aqueous case, the electrochemical cell of the present invention further comprises a current distributor disposed on one side of the flow field. An anode current distributor 40 is shown in FIG. 2 disposed on one side of anode flow field 28, and a cathode current distributor 42 is shown in FIG. 2 disposed on one side of cathode flow field 30. The anode current distributor collects current from the anode bus and distributes it to the anode by electronic conduction. The cathode current distributor collects current from the cathode and distributes it to the cathode bus by electronic conduction. The anode and the cathode current distributors preferably each comprise a non-porous layer. The anode current distributor thus provides a barrier between the anode current bus and the hydrogen halide, such as hydrogen chloride and the halogen gas, such as chlorine. The cathode current distributor provides a barrier between the cathode current bus and the liquid water added to the cathode inlet and hydrogen gas ($H_2(g)$) and the sodium hydroxide solution, NaOH(aq) exiting outlet 24. The current distributors of the present invention may be made of a variety of materials, and the material used for the anode current distributor need not be the same as the material used for the cathode current distributor. In one instance, the anode current distributor is made of platinized tantalum, and the cathode current distributor is made of a nickel-base alloy, such as UNS10665, sold as HASTELLOY® B-2, by Haynes, International.

In either the anhydrous or the aqueous case, the electrochemical cell also comprises a conductive structural support 44 disposed in contact with anode current distributor 40. The support on the anode side is preferably made of UNS31603 (316L stainless steel). A seal 45, preferably in the form of an O-ring made from a perfluoroelastomer, sold in parts under the trademark KALREZ® by DuPont, is disposed between structural support 44 on the anode side and anode current distributor 40. It should be noted that while structural support 44 is shown in front of anode current bus 46 in FIG. 2, it is within the scope of the present invention for the structural support to be placed behind the anode current bus (i.e., to the left of bus 46 as shown in FIG. 2) and still achieve the same results. The cathode current distributor acts as a corrosion-resistant structural backer on the cathode side. This piece can be drilled and tapped to accept the PFA fitting, which is used for the inlet and outlet.

Further in accordance with the either the anhydrous or the aqueous cases of the present invention, there is provided a process for producing a hydroxide solution, sulfuric acid and a halogen gas from a hydrogen halide and a sulfate solution. The hydrogen halide may be either hydrogen chloride, hydrogen fluoride, hydrogen bromide and hydrogen iodide, and the halogen may be either chlorine, fluorine, bromine or iodine, respectively.

As noted above for the cell, the sulfate solution comprises sulfate ions and cations. The cation may be either an alkali metal ion, an alkaline earth metal ion or an ammonium ion. However, it should be noted that the present invention need not be limited to these types of ions, provided that the ions are capable of passing through the cation-exchange membrane. When the cation is an alkali metal ion, the hydroxide solution is an alkali metal solution, and the sulfate solution is an alkali metal sulfate solution. Preferably, the alkali metal is either sodium or potassium. When the cation is an alkaline earth metal ion, the hydroxide solution is an alkaline earth metal solution, and the sulfate solution is an alkaline earth metal sulfate solution. Examples of alkaline earth metals suitable for use with the process of the present invention are magnesium and calcium. When the cation is an ammonium ion, the hydroxide solution is an ammonium solution, and the sulfate solution is an ammonium sulfate solution.

In the process of the present invention, a sulfate solution which comprises sulfate ions and cations is fed through an inlet, such as inlet 22, to a first compartment of an electrochemical cell, such as cell 10. Hydrogen halide is fed to a second compartment of the electrochemical cell through an inlet, such as inlet 14 as shown in FIG. 2. Current flows to the anode bus, and anode current distributor 40 collects current from the anode bus and distributes it to the anode by electronic conduction. The hydrogen halide is transported to an anode, such as anode 12 as shown in FIG. 2. In the anhydrous case, molecules of essentially anhydrous hydrogen halide are transported to the anode. The hydrogen halide is oxidized at the anode to produce halogen gas, which is shown as $Cl_2$ and which exits the cell through anode-side outlet 16 and protons, shown as $H^+$ as shown in FIG. 2. In the anhydrous case, the molecules of the anhydrous hydrogen halide are oxidized at the anode to form essentially dry halogen gas and protons. The equation for the anode reaction in the anhydrous case is:

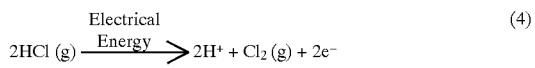

(4)

In the aqueous case, ions of aqueous hydrogen halide are fed to the second compartment through inlet 14 and are oxidized at the anode. The equation for the anode reaction in the aqueous case is:

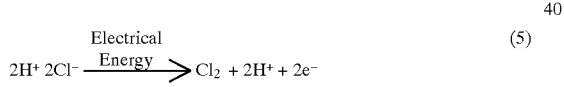

(5)

The protons produced by the oxidation of hydrogen halide at the anode are transported through the first cation-transporting membrane, which is disposed in contact with anode 12 as shown in FIG. 2. The first membrane rejects the sulfate ions, shown as $SO_4^=$ in FIG. 2, and the sulfate ions join the protons to form a sulfuric acid solution, $H_2SO_4$ (aq) as shown in FIG. 2. Water is fed to a third compartment of the cell through a cathode-side inlet, such as inlet 24 as shown in FIG. 2, and is reduced at the cathode to hydrogen and hydroxyl ions. In either the anhydrous or the aqueous case, the cathode reaction is:

$$2\ H_2O + 2e^- \rightarrow H_2 + 2OH^- \quad (6)$$

The second membrane rejects the hydroxyl ions as illustrated by the $OH^-$ and the angled arrow extending off membrane 19. The hydroxyl ions are joined with the cations, which in the illustrated case are sodium ions, to form a solution of alkali metal hydroxide, shown as NaOH(aq) in FIG. 2. Cathode current distributor 42 collects current from cathode 20 and distributes it to cathode bus 48.

The equation for the overall reaction for the cell in the anhydrous case is:

(7)

The equation for the overall reaction for the cell in the aqueous case is:

$$2HCl(aq) \rightarrow Cl_2 + H_2 \quad (8)$$

In the aqueous and the anhydrous cases, the electrochemical cell of the present invention can be operated over a wide range of temperatures. Room temperature operation is an advantage, due to the ease of use of the cell. However, operation at elevated temperatures provides the advantages of improved kinetics and increased electrolyte conductivity. Higher temperatures result in lower cell voltages. However, limits on temperature occur because of the properties of the materials used for elements of the cell. For example, the properties of a NAFION® membrane change when the cell is operated above 120° C. The properties of a polymer electrolyte membrane make it difficult to operate a cell at temperatures above 150 C. With a membrane made of other materials, such as a ceramic material like beta-alumina, it is possible to operate a cell at temperatures above 200° C.

It should be noted also that one is not restricted to operate the electrochemical cell of present invention at atmospheric pressure. The cell could be run at differential pressure gradients, which change the transport characteristics of water or other components in the cell, including the membrane.

Additional advantages and modifications will readily occur to those skilled in the art. The invention, in its broader aspects, is, therefore, not limited to the specific details and representative apparatus shown and described. Accordingly, departures may be made from such details without departing from the spirit or scope of the general inventive concept as defined by the appended claims and their equivalents.

What is claimed is:

1. A process for producing a hydroxide solution, sulfuric acid and a halogen gas from a hydrogen halide and a sulfate solution, wherein:

(a) a sulfate solution is fed to a first compartment of an electrochemical cell, wherein the sulfate solution comprises sulfate ions and cations;

(b) hydrogen halide is fed to a second compartment of the electrochemical cell and is transported to an anode of the cell;

(c) the hydrogen halide is oxidized at the anode to produce halogen gas and protons, and the protons are transported through a first cation-transporting membrane;

(d) the first membrane rejects the sulfate ions and the sulfate ions join the protons to form a sulfuric acid solution;

(e) water is fed to a third compartment of the cell and is reduced at a cathode of the cell to hydrogen and hydroxyl ions; and (f) a second membrane rejects the hydroxyl ions and the hydroxyl ions are joined with the cations to form a solution of hydroxide.

2. The process of claim 1, wherein the hydroxide solution is an alkali metal hydroxide solution, the sulfate solution is an alkali metal sulfate solution, and the cation is an alkali metal ion.

3. The process of claim 2, wherein the alkali metal is sodium.

4. The process of claim 2, wherein the alkali metal is potassium.

5. The process of claim 1, wherein the hydroxide solution is an alkaline earth metal hydroxide solution, the sulfate solution is an alkaline earth metal sulfate solution, and the cation is an alkaline earth metal ion.

6. The process of claim 5, wherein the alkaline earth metal is magnesium.

7. The process of claim 5, wherein the alkaline earth metal is calcium.

8. The process of claim 1, wherein the hydroxide solution is an ammmonium hydroxide solution, the sulfate solution is an ammonium hydroxide sulfate solution, and the cation is an ammonium ion.

9. The process of claim 1, wherein the hydrogen halide is selected from the group consisting of hydrogen chloride, hydrogen fluoride, hydrogen bromide and hydrogen iodide.

10. The process of claim 9, wherein the halogen gas is selected from the group consisting of chlorine gas, fluorine gas, bromine gas and iodine gas.

11. The process of claim 1, wherein molecules of essentially anhydrous hydrogen halide are fed to the second compartment and are oxidized at the anode.

12. The process of claim 1, wherein ions of aqueous hydrogen halide are fed to the second compartment and are oxidized at the anode.

13. A process for producing a sodium hydroxide solution, sulfuric acid and chlorine from essentially anhydrous hydrogen chloride and a sodium sulfate solution, wherein:

(a) a sodium sulfate solution is fed to a first compartment of an electrochemical cell, wherein the sodium sulfate solution comprises sulfate ions and sodium ions;

(b) molecules of essentially anhydrous hydrogen chloride are fed to a second compartment of the electrochemical cell and are transported to an anode of the cell;

(c) the molecules of anhydrous hydrogen chloride are oxidized at the anode to produce halogen gas and protons, and the protons are transported through a first cation-transporting membrane;

(d) the first membrane rejects the sulfate ions and the sulfate ions join the protons to form a sulfuric acid solution;

(e) water is fed to a third compartment of the electrochemical cell and is reduced to hydrogen and hydroxyl ions; and (f) a second membrane rejects the hydroxyl ions and the hydroxyl ions are joined with the sodium ions to form a solution of hydroxide.

14. An electrochemical cell for producing a hydroxide solution, sulfuric acid and a halogen gas from a hydrogen halide and a sulfate solution, comprising:

(a) means for introducing a sulfate solution to a first compartment of the cell, wherein the sulfate solution comprises sulfate ions and cations;

(b) means for introducing hydrogen halide to a second compartment;

(c) means for oxidizing the hydrogen halide to produce halogen gas and protons;

(d) first cation-transporting means for transporting the protons therethrough, wherein the first cation-transporting means is disposed in contact with the oxidizing means, the first cation-transporting means rejects the sulfate ions, and the sulfate ions join the protons to form a sulfuric acid solution;

(e) means for introducing water to a third compartment;

(f) means for reducing the water to hydrogen and hydroxyl ions; and (g) second cation-transporting means for rejecting the hydroxyl ions and for transporting the cations therethrough, wherein the second cation-transporting means is disposed in contact with the reducing means and the hydroxyl ions are joined with the cations to form a solution of hydroxide.

15. The electrochemical cell of claim 14, wherein the oxidizing means comprises means for oxidizing molecules of essentially anhydrous hydrogen halide to produce essentially dry halogen gas.

16. The electrochemical cell of claim 14, wherein the oxidizing means comprises means for oxidizing ions of aqueous hydrogen halide to produce wet halogen gas.

17. The electrochemical cell of claim 14, wherein the first cation-transporting means comprises a first membrane, the second cation-transporting means comprises a second membrane, and the first and second membranes face each other.

18. The electrochemical cell of claim 14, wherein the oxidizing means is an anode and the reducing means is a cathode, further comprising an anode mass flow field disposed in contact with the anode, and a cathode mass flow field disposed in contact with the cathode.

19. The electrochemical cell of claim 18, wherein the anode and the cathode mass flow fields have flow channels formed therein, and the flow channels of the anode mass flow field and the flow channels of the cathode mass flow field are parallel to each other.

20. The electrochemical cell of claim 19, wherein the flow channels of the anode mass flow field and of the cathode mass flow field are both vertical.

21. The electrochemical cell of claim 19, wherein each of the anode and the cathode comprise an electrochemically active material.

22. The electrochemical cell of claim 21, wherein the anode and the cathode are gas diffusion electrodes.

23. The electrochemical cell of claim 22, wherein the catalyst loading of the electrochemically active material is in the range of 0.10 to 0.50 mg/cm$^2$.

24. The electrochemical cell of claim 21, wherein the electrochemically active material comprises one of the following: platinum, ruthenium, osmium, rhenium, rhodium, iridium, palladium, gold, titanium and zirconium, and the oxides, alloys and mixtures thereof.

25. The electrochemical cell of claim 24, wherein the electrochemically active material is applied as a film from ink onto the membrane.

26. The electrochemical cell of claim 25, whereon the loading of the electrochemically active material is at least about 0.017 mg/cm$^2$.

27. The electrochemical cell of claim 24, wherein the first and the second cation-transporting means each comprises a copolymer of tetrafluoroethylene and poly-sulfonyl fluoride vinyl ether-containing pendant sulfonic acid groups.

28. The electrochemical cell of claim 27, wherein the electrochemically active material of the anode is ruthenium oxide.

29. The electrochemical cell of claim 28, wherein the electrochemically active material of the anode is platinum.

30. The electrochemical cell of claim 21, wherein the electrochemically active material is bonded to a support structure.

31. The electrochemical cell of claim 30, wherein the support structure comprises carbon paper.

32. The electrochemical cell of claim 30, wherein the support structure comprises graphite cloth.

33. The electrochemical cell of claim 30, wherein the electrochemically active material comprises a catalyst material on a support material.

34. The electrochemical cell of claim 33, wherein the support material comprises particles of carbon and particles of polytetrafluoroethylene.

35. The electrochemical cell of claim 34, wherein the electrochemically active material is bonded by the particles of polytetrafluoroethylene to the support structure.

* * * * *